United States Patent
Yoshida

(10) Patent No.: US 7,380,621 B2
(45) Date of Patent: Jun. 3, 2008

(54) HYBRID SYSTEM

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 10/584,134

(22) PCT Filed: Dec. 21, 2004

(86) PCT No.: PCT/IB2004/004207

§ 371 (c)(1),
(2), (4) Date: Jun. 23, 2006

(87) PCT Pub. No.: WO2005/065986

PCT Pub. Date: Jul. 21, 2005

(65) Prior Publication Data

US 2007/0088483 A1  Apr. 19, 2007

(30) Foreign Application Priority Data

Dec. 26, 2003  (JP) ............................. 2003-433875

(51) Int. Cl.
*B60K 1/00* (2006.01)
(52) U.S. Cl. .................. 180/65.3; 180/65.8; 180/65.4; 903/902; 903/908
(58) Field of Classification Search ............... 180/65.3, 180/65.4, 65.2, 65.8, 65.6; 429/17, 19; 701/22; 318/727, 700; 320/104, 126, 101; 903/903, 903/902, 908, 944
See application file for complete search history.

(56) References Cited

U.S. PATENT DOCUMENTS

| | | | |
|---|---|---|---|
| 6,321,145 B1 * | 11/2001 | Rajashekara | 701/22 |
| 6,617,820 B2 * | 9/2003 | Carlson et al. | 318/727 |
| 6,684,135 B2 * | 1/2004 | Uenodai et al. | 701/22 |
| 6,800,387 B2 * | 10/2004 | Shimada et al. | 429/17 |
| 6,975,091 B2 * | 12/2005 | Lee et al. | 320/104 |
| 7,028,792 B2 | 4/2006 | Ishikawa et al. | |
| 2001/0053950 A1 | 12/2001 | Hasegawa et al. | |
| 2002/0136935 A1 | 9/2002 | Iwasaki | |
| 2003/0148154 A1 | 8/2003 | Kawasumi et al. | |
| 2006/0208691 A1 * | 9/2006 | Sugiura et al. | 320/101 |

FOREIGN PATENT DOCUMENTS

EP    1 291 949 A2    3/2003
JP    A 2000-315511   11/2000

OTHER PUBLICATIONS

Nadal et al., "Development of Hybrid Fuel Cell/Battery Powered Electric Vehicle," Int. J. Hydrogen Energy, vol. 21, No. 6, pp. 497-505, 1996.

* cited by examiner

*Primary Examiner*—Hau V Phan
(74) *Attorney, Agent, or Firm*—Oliff & Berridge, PLC

(57) ABSTRACT

An hybrid system (10) of the invention includes a fuel cell unit (20) that generates electricity upon being supplied with reaction gases, a secondary battery (40) that stores electric power generated by the fuel cell unit (20), and an electric power control device (30) that controls distribution of electric power supplied to electric power loads (M1, M2) from the fuel cell unit (20) and the secondary battery (40). The secondary battery (40) has a capacity characteristic of being able to supply the requested amounts of electric power of the electric power loads (M1, M2) at least during an early stage following restart of operation of the fuel cell unit (20) from a state of pause of operation.

11 Claims, 2 Drawing Sheets

HYBRID SYSTEM

FIELD OF THE INVENTION

The invention relates to a hybrid system in which a fuel cell unit and an electricity storage device are installed. More particularly, the invention relates to an installation design technology for an electricity storage device that has a capacity characteristic that accords with the vehicle characteristics.

BACKGROUND OF THE INVENTION

A known electric power source installed in a fuel cell electric vehicle is a hybrid system in which a reformer, a fuel cell unit and a storage battery are installed. A hybrid system of this type is disclosed in, for example, Japanese Patent Application Laid-Open Publication No. 2000-315511 (JP-A-2000-315511). In a construction disclosed therein, electric power is distributed from the fuel cell unit or the storage battery, via an electric power regulator, to a vehicle-driving traction motor, and accessories of the fuel cell unit, and the reformer, in accordance with driver's operation of an accelerator. The storage battery capacity provided in the vehicle is set at an amount that, when the system is started, allows supply of electric power to the traction motor, the accessories of the fuel cell unit only from the storage battery during a period until the reformer is sufficiently warmed up and is able to stably supply a reformed gas to the fuel cell unit.

In a fuel cell electric vehicle having such a hybrid system, the response delay of the fuel cell unit (a time delay prior to performance of steady electricity generation) at the time of detection of a high load request during an intermittent operation mode becomes a problem. The intermittent operation mode refers to an operation mode in which during a low load condition, for example, during idling or deceleration or the like, the operation of the fuel cell unit is temporarily stopped, and the vehicle is driven only on the basis of the supply of electric power from the storage battery. If the intermittent operation duration (duration of pause of operation) of the fuel cell unit becomes long, there is possibility of deterioration of the I-V characteristic (electric current-to-voltage characteristic) of the fuel cell unit from the I-V characteristic occurring prior to the pause of the fuel cell unit. The I-V characteristic of the fuel cell unit fluctuates all the time depending on the cell temperature, the reaction gas flow, the gas pressure and the humidity, and also considerably fluctuates with fluctuations of the internal resistance of a polymer electrolyte membrane caused by changes in the water content as well as states of battery operation (an excessive state, a steady state, etc.). Once the I-V characteristic deteriorates, a restart of the fuel cell unit in response to a high load request does not immediately achieve a sufficient recovery of the cell voltage; specifically, a time of about 1 to 2 seconds is required for the recovery to a sufficient voltage. Besides the response delay of the fuel cell unit, the response delay of the entire fuel cell system, including the accessories thereof, is unignorable. If the response delay of the fuel cell unit becomes equal to or longer than 200 ms, remarkably degraded drivability results. Therefore, there is a strong demand for development of an improvement technology regarding the response delay of the fuel cell unit.

There is another problem to be solved. If the storage battery capacity provided in a fuel cell electric vehicle is insufficient, it becomes impossible to cope with a high load request. On the other hand, provision of an excessively large storage battery capacity is a waste of resources. Thus, there is a need to review the installation design so that a storage battery that accords with the vehicle characteristics will be selected.

DISCLOSURE OF THE INVENTION

It is an object of the invention to provide a hybrid system capable of achieving both improved fuel economy and better drivability.

A first aspect of the invention relates to a hybrid system including: a fuel cell unit that generates electricity upon being supplied with a reaction gas; an electricity storage device that stores electric power generated by the fuel cell unit; an electric power load; and an electric power control device that controls distribution of electric power supplied to the electric power load from the fuel cell unit and the electricity storage device. The electricity storage device has a capacity characteristic of being able to supply a requested amount of electric power of the electric power load at least during an early stage following restart of operation of the fuel cell unit from a state of pause of operation. By installing the electricity storage device having a capacity characteristic of being able to supply the requested amount of electric power of the electric power load at least during an early stage following restart of operation of the fuel cell unit from a state of pause of operation, it becomes possible to absorb the response delay of the fuel cell unit after the beginning of restart of operation of the unit. Therefore, it becomes unnecessary to provide any particular limitation on the duration of pause of operation of the fuel cell unit, and it becomes possible to considerably improve fuel economy.

A second aspect of the invention relates to a hybrid system including: a fuel cell unit that generates electricity upon being supplied with a reaction gas; an electricity storage device that stores electric power generated by the fuel cell unit; an electric power load; an electric power control device that controls distribution of electric power supplied to the electric power load from the fuel cell unit and the electricity storage device; and a control portion that controls operation of the fuel cell unit. Upon detecting a requested amount of electric power that is higher than a predetermined value during a pause of operation of the fuel cell unit, the control portion performs an operation control so that the fuel cell unit restarts operation, and controls the electric power control device so that the requested amount of electric power is supplied to the electric power load only from the electricity storage device at least during an early stage following a beginning of restart of the operation of the fuel cell unit. Due to the above-described construction in which, during an early stage following the beginning of restart of operation of the fuel cell unit in response to a high load request (i.e., a load request where the requested amount of electric power is higher than a predetermined value) that is detected during a pause of operation of the fuel cell unit during a low load condition, the requested amount of electric power is supplied to the electric power load only from the electricity storage device, it becomes possible to absorb the response delay of the fuel cell unit. Therefore, it becomes unnecessary to provide any particular limitation on the duration of pause of operation of the fuel cell unit, and it becomes possible to considerably improve fuel economy. Incidentally, the aforementioned predetermined value is the requested amount of electric power that requires the restart of operation of the fuel cell unit.

The electricity storage device may have a capacity characteristic of being able to supply the electric power load with a maximum electric power consumed by the electric power load at least during the early stage following the restart of the operation of the fuel cell unit. This construction makes it possible to supply the maximum amount of requested electric power that the electric power loads can request immediately after the fuel cell unit begins to restart operation.

Examples of the electric power load include a vehicle-driving traction motor, accessories of the fuel cell unit, etc. If an electricity storage device having a capacity characteristic (i.e., a capacity characteristic that accords with the characteristics of the vehicle) of being able to provide the requested electric power of the system factoring in the electric power consumption of the accessories as well is installed in a fuel cell electric vehicle, better drivability of the fuel cell electric vehicle can be achieved.

According to the hybrid system of the first and second aspects, the response delay of the fuel cell unit can be absorbed by installing an electricity storage device that has a capacity characteristic of being able to supply the requested amount of electric power of the electric power load during an early stage following the beginning of restart of operation of the fuel cell unit from a state of pause of operation. Therefore, it becomes unnecessary to provide any particular limitation on the duration of pause of operation of the fuel cell unit, and it becomes possible to considerably improve fuel economy. Furthermore, by installing in a fuel cell electric vehicle an electricity storage device having a capacity characteristic that accords with the characteristics of the vehicle, better drivability can be achieved.

A third aspect of the invention relates to a control method for a hybrid system that has a fuel cell unit that generates electricity upon being supplied with a reaction gas, an electricity storage device that stores electric power generated by the fuel cell unit, and an electric power load, and that supplies an electric power from the fuel cell unit and an electricity storage device. The method includes the steps of: determining whether the requested amount of electric power of the electric power load is higher than a predetermined value during a pause of operation of the fuel cell unit; performing an operation control so that the fuel cell unit restarts operation if it is determined that the requested amount of electric power of the electric power load is higher than the predetermined value; and supplying the requested amount of electric power to the electric power load only from the electricity storage device at least during an early stage following a beginning of restart of the operation of the fuel cell unit.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
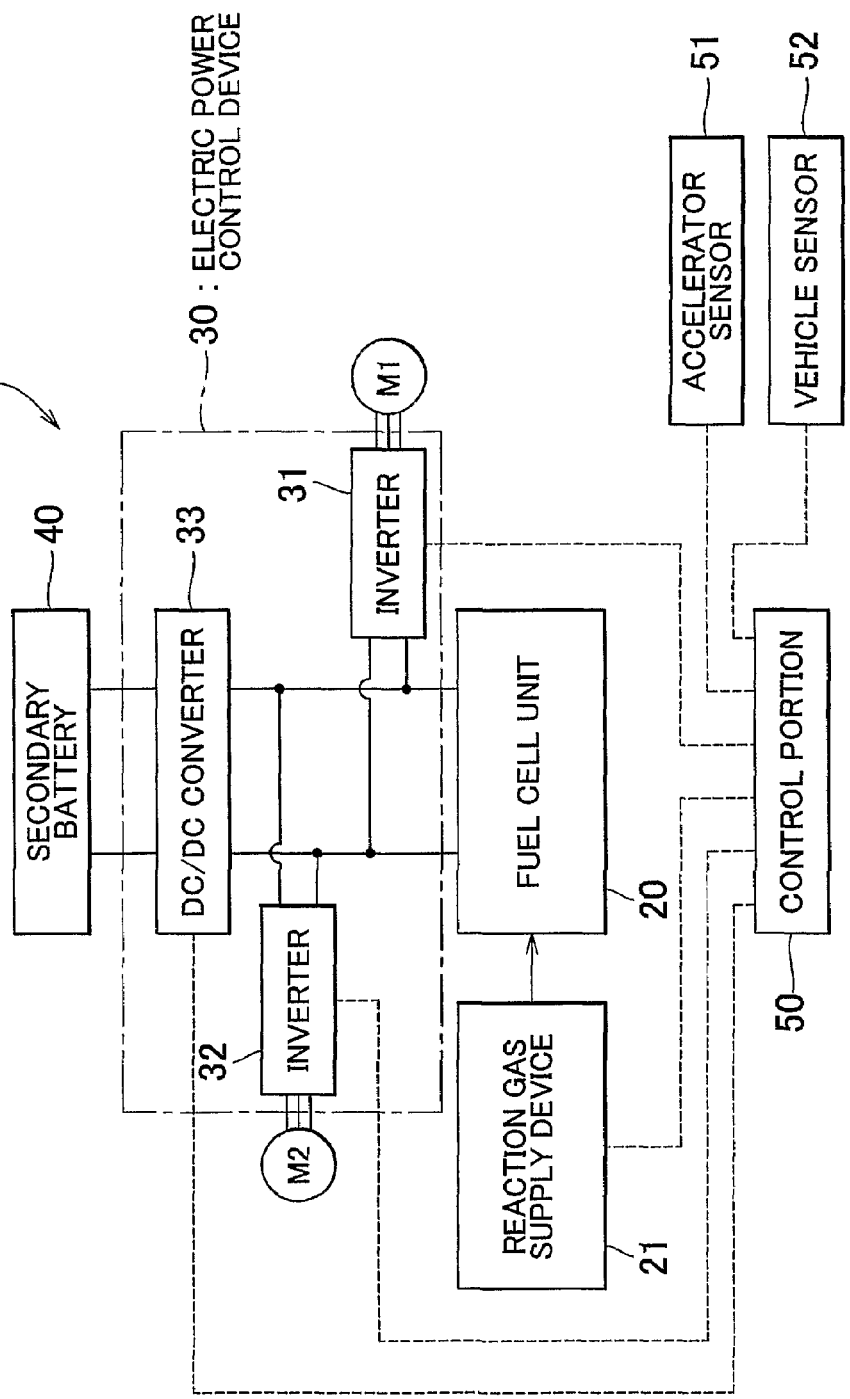
FIG. 1 is a main construction diagram of a hybrid system in accordance with an embodiment of the invention.

FIG. 1 is a main construction diagram of a hybrid system (FCHV system) that functions as an electric power supply device of a fuel cell electric vehicle (FCEV).

A hybrid system 10 mainly has a fuel cell unit 20 that generates electricity upon being supplied with reaction gases (a fuel gas and an oxidizing gas), a reaction gas supply device 21 for supplying the reaction gases to the fuel cell unit 20, a secondary battery (electricity storage device) 40 that stores the electric power generated by the fuel cell unit 20 and the regenerative energy obtained during the braking of the vehicle, an electric power control device (power control unit) 30 that controls the distribution of the electric power to be supplied from the fuel cell unit 20 and the secondary battery 40 to electric power loads, and a control portion 50 that operates and controls the fuel cell unit 20.

As examples of the electric power loads, FIG. 1 shows a traction motor (external load) M1 for driving the vehicle, and an accessory motor M2 for actuating accessories (e.g., an air-compressor, a hydrogen circulating pump, etc.), merely for convenience in description. Although the secondary battery 40 is shown as an electricity storage device, other devices, such as an electric double layer capacitor or the like, may also be adopted as an electricity storage device.

The electric power control device 30 includes inverters 31, 32 that convert the direct-current electric power generated by the fuel cell unit 20 into alternating-current electric power (e.g., three-phase AC electric power) and supplies the alternating-current electric power to motors (e.g., three-phase AC motors) M1, M2, and a DC/DC converter 33 that controls the supply and distribution of the electric power of the secondary battery 40 and the fuel cell unit 20 by adjusting the output voltage of the fuel cell unit 20. The inverters 31, 32 and the DC/DC converter 33 are each connected in parallel to output terminals of the fuel cell unit 20.

The control portion 50 determines a requested electric power of the entire system (a total sum of the vehicle-driving electric power and the accessory electric power) on the basis of the degree of accelerator operation and the vehicle speed detected by an accelerator sensor 51 and a vehicle speed sensor 52. Next, the control portion 50 determines the allocations of output electric power of the fuel cell unit 20 and the secondary battery 40, and adjusts the amounts of the reaction gases supplied to the fuel cell unit 20 by controlling the reaction gas supply device 21 so that the amount of power generated by the fuel cell unit 20 reaches a target electric power, and adjusts the operation point of the fuel cell unit 20 (output voltage, output current) by controlling the DC/DC converter 33. Furthermore, the control portion 50 controls the inverter 31 to adjust the rotation speed and rotation torque of the traction motor M1 so as to achieve a target vehicle speed in accordance with the degree of accelerator operation.

Figure 3:
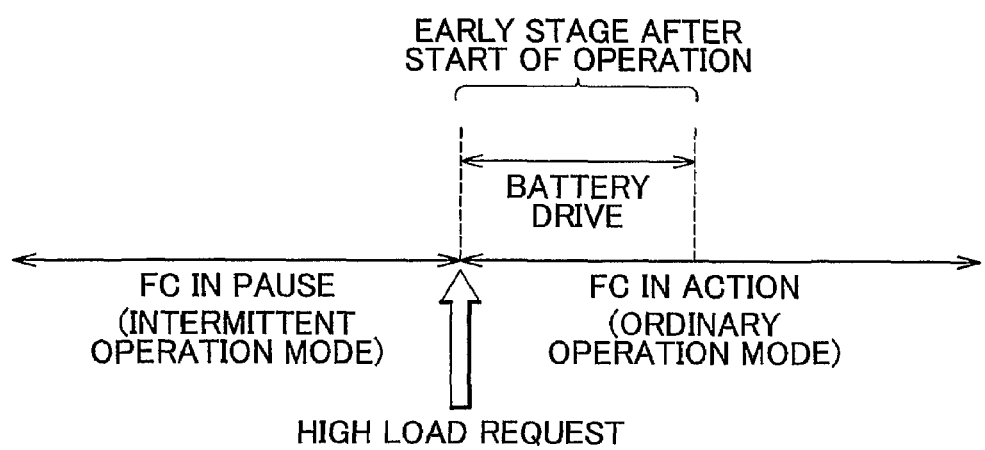
FIG. 3 is a diagram illustrating transition of operation modes.

The hybrid system 10 operates the fuel cell unit 20 to supply electric power to electric power loads during a high load condition. During a low load condition (idling, deceleration, etc.), the hybrid system 10 enters an intermittent operation mode during which the operation of the fuel cell unit 20 is temporarily stopped. For convenience in description, the operation mode during which the fuel cell unit 20 is in operation will be referred to as "ordinary operation mode", and will thus be distinguished from the "intermittent operation mode" during which the fuel cell unit 20 is in a pause. During the intermittent operation mode, the duration of pause of operation of the fuel cell unit 20 is not particularly limited; that is, the pause of operation of the fuel cell unit 20 is continued until detection of a high load request (i.e., a load request where the requested amount of electric power is greater than a predetermined value) as indicated in FIG. 3. At the time point of detection of a high load request, the hybrid system 10 moves from the intermittent operation mode to the ordinary operation mode. If the operation of the fuel cell unit 20 pauses for some time, the I-V characteristic of the fuel cell unit 20 deteriorates. Then, if a high load request is detected, the deteriorated I-V characteristic thereof does not immediately recover to a steady state, but the recovery requires a certain amount of time (e.g., 1 to 2 seconds). Therefore, during an early stage following a restart of operation of the fuel cell unit 20, only the electric power supplied from the secondary battery 40 is used for the supply of electric power to electric power loads such as the traction motor M1, the accessory motor M2, etc. That is, the requested electric power of the entire system which is needed during an early stage (e.g., 1 to 2 seconds) prior to the recovery of the I-V characteristic of the fuel cell unit 20 to the steady state is provided by using only the electric power output from the secondary battery 40. In this manner, the response delay of the fuel cell unit 20 is absorbed, so that better drivability can be achieved. As the operation state of the fuel cell unit 20 changes to a steady state, the supply of electric power from the fuel cell unit 20 starts, following the supply of electric power from the secondary battery 40.

Figure 2:
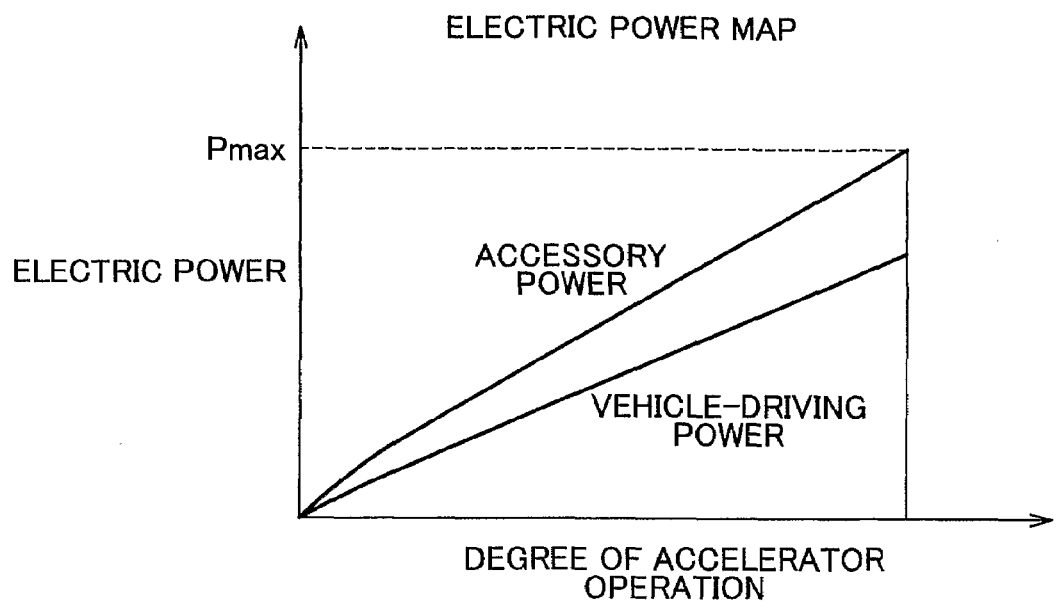
FIG. 2 indicates map values of requested electric power of an entire system corresponding to the degree of accelerator operation.

In order to provide the entire requested electric power by using only the output electric power of the secondary battery 40 during an early stage following restart of operation of the fuel cell unit 20, it is necessary to install in the vehicle a secondary battery 40 that has a capacity characteristic (battery specifications) that accords with the vehicle characteristics. FIG. 2 indicates map values of the requested electric power corresponding to the degree of accelerator operation, and illustrates monotonous increases of the vehicle-driving electric power and the accessory electric power corresponding to increases in the degree of accelerator operation. Where the maximum value of the requested electric power of the entire system is Pmax as shown in FIG. 2, it is desirable that the secondary battery 40 have, as a capacity characteristic, a discharge characteristic of being able to output the maximum electric power Pmax [kW] consumed by the system at least during an early stage (response time t [sec]) following restart of operation of the fuel cell unit 20 (e.g., Pmax [kW]×t [sec], or battery specifications equivalent thereto). Thus, by installing in a vehicle the secondary battery 40 having a capacity characteristic of being able to output the maximum electric power Pmax [kW] consumed by the system for consumption, it becomes possible to drive the vehicle with the maximum power immediately after the change from the intermittent operation mode to the ordinary operation mode.

The term "vehicle characteristics" herein refers to the vehicle weight of the fuel cell electric vehicle as well as the maximum vehicle speed, the torque output characteristic, the car model thereof, etc. The vehicle-driving electric power and the accessory electric power corresponding to the degree of accelerator operation vary depending on the characteristics of the vehicle. Examples of conceivable parameters of the requested electric power of the system factoring in the accessory electric power as well include the following parameters.

(1) The outputs of the vehicle-driving traction motor M1, the inverters 31, 32, and the DC/DC converter 33, and loss of electric power in the accessories.

(2) The electric power for actuating the accessories of the fuel cell unit 20 (accessories capable of being actuated by the storage battery, such as an air compressor, a hydrogen circulating pump, etc.), and loss of electric power in the accessories.

(3) The electric power for actuating the other accessories (accessories capable of being actuated by the storage battery, such as an air-conditioner, a power steering, etc.), and loss of electric power in the accessories.

(4) The output of the DC/DC converter 33 supplied to a storage battery for accessories that operate at a voltage below 100 V, for example, a voltage of 12 V, 24 V, 42 V, etc., and loss of electric power in the accessories.

According to this embodiment, during an early stage of operation of the fuel cell unit 20 following restart thereof in response to a high load request detected during a pause of operation of the fuel cell unit 20 during a low load condition, the electric power is supplied to the electric power loads only from the secondary battery 40. This construction makes it possible to absorb the response delay of the fuel cell unit 20. Therefore, the high load request (power request) can be used as a condition for discontinuing the intermittent operation mode regardless of the length of the duration of pause of operation of the fuel cell unit 20. Hence, it is unnecessary to provide any particular limitation on the duration of pause of operation of the fuel cell unit 20, so that fuel economy can be considerably improved. Furthermore, a good improvement in fuel economy is expected in comparison with a system that, during an intermittent operation mode, operates the fuel cell unit at fixed time intervals to perform short-time generation of electricity so as to reduce the deterioration of the I-V characteristic of the fuel cell unit 20. The accessory electric power consumed to start the fuel cell unit 20 is about the same as the electric power consumed for high-speed cruise of the vehicle on flat roads. Therefore, the unlimited duration of pause of operation of the fuel cell unit 20 is advantageous in improving fuel economy. Furthermore, since the maximum power (the maximum amount of requested electric power that the electric power loads can request, i.e., the maximum electric power consumed by the electric loads) can be supplied to the electric power loads during an early stage following the beginning of restart of operation of the fuel cell unit, better drivability can be achieved. Still further, by installing in a vehicle the secondary battery 40 that accords with the vehicle characteristics, an ideal hybrid control of the fuel cell unit can be achieved.

As for the secondary battery 40, it is preferable to use a secondary battery that is able to deliver the above-described discharge characteristic despite fluctuations to some extent in the SOC (amount of remaining charge). If the SOC of the storage battery tends to be low, it is desirable that electric power be supplied, with priority, to the accessories needed for starting the fuel cell unit 20, and the rest of the electric power is allocated as the vehicle-driving electric power and the other accessory electric power, and thus the distribution of electric power is restricted. If the operation state of the fuel cell unit 20 changes to the steady state, the electric power generated by the fuel cell unit 20 is allocated for charging the secondary battery 40, and the aforementioned electric power distribution limitation is removed.

The invention claimed is:

1. A hybrid system comprising:
   a fuel cell unit that generates electricity upon being supplied with a reaction gas;
   an electricity storage device that stores electric power generated by the fuel cell unit;
   an electric power load; and an electric power control device that controls distribution of electric power supplied to the electric power load from the fuel cell unit and the electricity storage device, wherein the electricity storage device has a capacity characteristic of being able to supply a requested amount of electric power of the electric power load at least during an early stage following restart of operation of the fuel cell unit from a state of pause of operation, and the requested amount of electric power includes a vehicle-driving electric power and an accessory electric power.

2. The hybrid system according to claim 1, wherein the electricity storage device has a capacity characteristic of being able to supply the electric power load with a maximum electric power consumed by the electric power load at least during the early stage following the restart of the operation of the fuel cell unit.

3. The hybrid system according to claim 1, wherein the electric power load includes a traction motor for driving a vehicle, and an accessory of the fuel cell unit.

4. The hybrid system according to claim 1, wherein the early stage following restart of operation is a period that continues from the restart of the operation of the fuel cell unit until the fuel cell unit recovers an I-V characteristic of a steady state.

5. The hybrid system according to claim 1, wherein the pause of operation of the fuel cell unit includes a pause that occurs during an intermittent operation state of the fuel cell unit.

6. A hybrid system comprising:
    a fuel cell unit that generates electricity upon being supplied with a reaction gas;
    an electricity storage device that stores electric power generated by the fuel cell unit;
    an electric power control device that controls distribution of electric power supplied to the electric power load from the fuel cell unit and the electricity storage device;
    an electric power load; and
    a control portion that controls operation of the fuel cell unit,
    wherein upon detecting a requested amount of electric power that is higher than a predetermined value during a pause of operation of the fuel cell unit, the control portion performs an operation control so that the fuel cell unit restarts operation, and controls the electric power control device so that the requested amount of electric power is supplied to the electric power load only from the electricity storage device at least during an early stage following a beginning of restart of the operation of the fuel cell unit, and
    the requested amount of electric power includes a vehicle-driving electric power and an accessory electric power.

7. The hybrid system according to claim 6, wherein the electricity storage device has a capacity characteristic of being able to supply the electric power load with a maximum electric power consumed by the electric power load at least during the early stage following the restart of the operation of the fuel cell unit.

8. The hybrid system according to claim 6, wherein the electric power load includes a traction motor for driving a vehicle, and an accessory of the fuel cell unit.

9. The hybrid system according to claim 6, wherein the early stage following restart of operation is a period that continues from the restart of the operation of the fuel cell unit until the fuel cell unit recovers an I-V characteristic of a steady state.

10. The hybrid system according to claim 6, wherein the pause of operation of the fuel cell unit includes a pause that occurs during an intermittent operation state of the fuel cell unit.

11. A control method for a hybrid system that has a fuel cell unit that generates electricity upon being supplied with a reaction gas, an electricity storage device that stores electric power generated by the fuel cell unit, and an electric power load, and that supplies an electric power from the fuel cell unit and an electricity storage device to the electric power load, comprising:
    determining whether the requested amount of electric power of the electric power load is higher than a predetermined value during a pause of operation of the fuel cell unit;
    performing an operation control so that the fuel cell unit restarts operation if it is determined that the requested amount of electric power of the electric power load is higher than the predetermined value; and
    supplying the requested amount of electric power to the electric power load only from the electricity storage device at least during an early stage following a beginning of restart of the operation of the fuel cell unit,
    wherein the requested amount of electric power includes a vehicle-driving electric power and an accessory electric power.

* * * * *